United States Patent
Yu et al.

(10) Patent No.: US 11,785,627 B2
(45) Date of Patent: Oct. 10, 2023

(54) RESOURCE PREEMPTION METHOD, APPARATUS, AND SYSTEM

(71) Applicant: HUAWEI TECHNOLOGIES CO., LTD., Guangdong (CN)

(72) Inventors: Chang Yu, Shenzhen (CN); Junren Chang, Beijing (CN); Xiangdong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 17/519,739

(22) Filed: Nov. 5, 2021

(65) Prior Publication Data

US 2022/0061057 A1 Feb. 24, 2022

Related U.S. Application Data

(63) Continuation of application No. PCT/CN2020/091637, filed on May 21, 2020.

(30) Foreign Application Priority Data

May 22, 2019 (CN) .......................... 201910431498.X

(51) Int. Cl.
*H04W 72/53* (2023.01)
*H04W 76/30* (2018.01)
(Continued)

(52) U.S. Cl.
CPC .......... *H04W 72/53* (2023.01); *H04W 28/26* (2013.01); *H04W 72/542* (2023.01); *H04W 76/30* (2018.02); *H04W 92/18* (2013.01)

(58) Field of Classification Search
CPC ... H04W 72/53; H04W 28/26; H04W 72/542; H04W 76/30; H04W 92/18; H04W 72/20;
(Continued)

(56) References Cited

U.S. PATENT DOCUMENTS 6,058,307 A * 5/2000 Garner ............... H04B 7/18567
455/12.1
2016/0212625 A1* 7/2016 Damnjanovic ... H04W 74/0875
(Continued)

FOREIGN PATENT DOCUMENTS

CN 104581784 A 4/2015
CN 106470097 A 3/2017
(Continued)

OTHER PUBLICATIONS

LG Electronics, "Discussion on sidelink resource allocation mechanism," 3GPP TSG RAN WG1 Meeting #94bis, R1-1810283, Chengdu, China, Oct. 8-12, 2018, 7 pages.
(Continued)

*Primary Examiner* — Afshawn M Towfighi
(74) *Attorney, Agent, or Firm* — Fish & Richardson P.C.

(57) ABSTRACT

Embodiments of this application provide a resource preemption method, an apparatus, and a system, to reduce a quantity of times of frequent resource preemption, and improve resource security. In one example, a first terminal device obtains a first time interval and a second time interval, and preempts or determines not to preempt a first resource according to a first preset rule. The first resource is a resource reserved by a second terminal device or a resource reserved for a first service to be transmitted by the first terminal device. The first time interval is a time interval related to the first resource. The second time interval is used to indicate a preemption forbidden time. The first preset rule is determined based on the first time interval and the second time interval.

20 Claims, 7 Drawing Sheets

(51) Int. Cl.
*H04W 28/26* (2009.01)
*H04W 72/542* (2023.01)
*H04W 92/18* (2009.01)

(58) Field of Classification Search
CPC ... H04W 72/56; H04W 72/569; H04W 72/02; H04W 28/0268; H04L 47/821; H04L 47/245; H04L 47/24; H04L 47/2491
See application file for complete search history.

(56) References Cited

U.S. PATENT DOCUMENTS

| | | | | |
|---|---|---|---|---|
| 2018/0206260 A1* | 7/2018 | Khoryaev | | H04W 72/1263 |
| 2019/0349795 A1* | 11/2019 | Park | | H04W 72/23 |
| 2021/0144750 A1* | 5/2021 | Cao | | H04W 72/0453 |
| 2021/0410129 A1* | 12/2021 | Freda | | H04W 72/543 |

FOREIGN PATENT DOCUMENTS

| | | |
|---|---|---|
| CN | 106664569 A | 5/2017 |
| CN | 106888079 A | 6/2017 |
| CN | 107079450 A | 8/2017 |
| CN | 107402821 A | 11/2017 |
| CN | 108633023 A | 10/2018 |
| EP | 3425981 A1 | 1/2019 |
| WO | 2018027528 A1 | 2/2018 |

OTHER PUBLICATIONS

PCT International Search Report and Written Opinion issued in International Application No. PCT/CN2020/091637 dated Aug. 19, 2020, 10 pages (partial English translation).
Extended European Search Report issued in European Application No. 20809432.6 dated Apr. 29, 2022, 11 pages.
Fraunhofer HHI et al., "Resource Allocation for Mode 2 NR V2X," 3GPP TSG RAN WG1 #97, R1-1906651, Reno, USA, May 13-17, 2019, 4 pages.
Intel Corporation, "Feature Lead Summary for NR-V2X Al-7.2.4.1.4 Resource Allocation Mechanism," 3GPP TSG RAN WG1 Meeting #96, R1-1903623, Athens, Greece, Feb. 25-Mar. 1, 2019, 18 pages.
Vivo, "Discussion on mode 2 resource allocation mechanism," 3GPP TSG RAN WG1 #96bis, R1-1904074, Xi'an, China, Apr. 8-12, 2019, 11 pages.
Chaieb et al., "A New Pre-emption Policy For MPLS-TE Networks," 2007 15th IEEE International Conference on Networks, Nov. 2007, 7 pages.
Fujitsu, "Resource Allocation for NR V2X Sidelink Communication considering low latency requirement," 3GPP TSG RAN WG1 Meeting #94bis, R1-1810593, Chengdu, China, Oct. 8-12, 2018, 6 pages.
Office Action issued in Chinese Application No. 201910431498.X dated Nov. 26, 2021, 12 pages (with English translation).
Xiaochuan et al., "FPTS: A Fixed-Priority Preemption Threshold Scheduling Algorithm in the Presence of Resources Sharing," Journal of Computer Research and Development, 2009, 8 pages (with English abstract).

* cited by examiner

RESOURCE PREEMPTION METHOD, APPARATUS, AND SYSTEM

CROSS-REFERENCE TO RELATED APPLICATIONS

This application is a continuation of International Application No. PCT/CN2020/091637, filed on May 21, 2020, which claims priority to Chinese Patent Application No. 201910431498.X, filed on May 22, 2019. The disclosures of the aforementioned applications are hereby incorporated by reference in their entireties.

TECHNICAL FIELD

This application relates to the communications field, and in particular, to a resource preemption method, an apparatus, and a system.

BACKGROUND

In new radio (NR) vehicle-to-everything (V2X) communication, a terminal device may perform communication in an autonomous mode. In the autonomous mode, the terminal device autonomously selects, by sensing resources, an appropriate sidelink (SL) resource for data transmission. A sensing mechanism mainly includes scheduling assignment (scheduling assignment, SA) decoding and energy measurement. The terminal device may decode an SA of another terminal device in a sliding sensing window, to obtain a time-frequency resource reserved by the another terminal device and a sidelink proSe per-packet priority (PPPP) that needs to be sent on the time-frequency resource, and then select, based on energy measurement, an SL resource for data transmission from resources that are not reserved by other terminal devices or on which a to-be-transmitted data packet has a lower priority.

In the autonomous mode, when a priority of a to-be-transmitted service data packet of the terminal device is higher than the PPPP indicated in the SA decoded by the terminal device, the terminal device may preempt the time-frequency resource indicated in the SA, that is, the time-frequency resource reserved by the another terminal device is reserved as a time-frequency resource of the terminal device. In NR V2X, after preempting a time-frequency resource, the terminal device sends a preemption message, where the preemption message carries position information of the preempted time-frequency resource. This may decrease a probability that another terminal device that receives the preemption message selects the time-frequency resource indicated in the preemption message. In addition, after receiving the preemption message, a terminal device whose resource is preempted may determine in advance that the resource reserved by the terminal device is preempted. Therefore, the terminal device may have sufficient time to reselect a resource to send data based on predetermined time, thereby reducing a service delay.

However, even if the terminal device that preempts the resource may send the preemption message to indicate the resource preempted by the terminal device, there is still a case in which the resource is preempted again by another terminal device. In other words, the resource may be frequently preempted, and resource security cannot be ensured. Therefore, a rule for restricting resource preemption needs to be set to reduce a quantity of times of frequent resource preemption, and improve resource security.

SUMMARY

Embodiments of this application provide a resource preemption method, an apparatus, and a system, to reduce a quantity of times of frequent resource preemption, and improve resource security.

To achieve the foregoing objectives, the following technical solutions are used in embodiments of this application.

According to a first aspect, a resource preemption method and a corresponding communications apparatus are provided. The method includes: A first terminal device obtains a first time interval and a second time interval. The first time interval is a time interval related to a first resource. The second time interval is used to indicate a preemption forbidden time. The first resource is a resource reserved by a second terminal device or the first resource is a resource reserved for a first service to be transmitted by the first terminal device. A priority of the first service is lower than a priority of a second service to be transmitted by the first terminal device. The first terminal device preempts or determines not to preempt the first resource according to a first preset rule, where the first preset rule is determined based on the first time interval and the second time interval. According to this solution, when the first terminal device determines that the first resource can be preempted but the first terminal device has not started a preemption process, the first terminal device needs to obtain the first time interval and the second time interval, and preempt or determine not to preempt the first resource according to the first preset rule. This can prevent the first terminal device from arbitrarily preempting the first resource, reduce a quantity of times of frequent resource preemption, and improve resource security.

In a possible design, the first preset rule includes: When the first time interval is greater than the second time interval, the first terminal device preempts the first resource; or when the first time interval is less than or equal to the second time interval, the first terminal device determines not to preempt the first resource. According to this solution, when the first time interval is greater than the second time interval, that is, a start moment of the first time interval falls beyond the preemption forbidden time, the first terminal device preempts the first resource. When the first time interval is less than or equal to the second time interval, that is, the start moment of the first time interval falls within the preemption forbidden time, the first terminal device determines not to preempt the first resource. Therefore, this prevents the first terminal device from preempting the first resource, within the preemption forbidden time, that may be preempted by another terminal device. This reduces a quantity of times of frequent resource preemption, and improves resource security.

In a possible design, the first resource is a resource reserved by the second terminal device. The resource preemption method provided in this embodiment of this application further includes: The first terminal device obtains a third time interval and a fourth time interval, where the third time interval is a time interval between a current moment and a start moment of the first resource, and the fourth time interval is a time interval corresponding to the second time interval. The first terminal device cancels or determines to retain a sidelink buffer status report or a scheduling request according to a second preset rule, where the second preset rule is determined based on the third time interval and the fourth time interval.

In a possible design, the second preset rule includes: When the third time interval is less than the fourth time interval, the first terminal device cancels the sidelink buffer status report or the scheduling request.

In a possible design, the first resource is a resource reserved by the second terminal device. The resource preemption method provided in this embodiment of this application further includes: The first terminal device releases or determines to retain the first resource according to a third preset rule, where the third preset rule is determined based on the third time interval and the fourth time interval.

In a possible design, the third preset rule includes: When the third time interval is greater than or equal to the fourth time interval, and the first terminal device obtains information about a resource scheduled by a network device for the first terminal device, the first terminal device releases the first resource. According to this solution, after preempting the first resource, the first terminal device may further determine security of the first resource, determine to use the first resource to transmit the second service only when the first resource is secure, and cancel the SR or BSR triggered on the sidelink. Alternatively, the first terminal device may release the preempted resource, to coordinate resources in a scenario in which a scheduling mode and an autonomous mode coexist. This improves resource utilization and reduces a waste of resources.

In a possible design, the first resource is a resource reserved by the second terminal device. That the first terminal device obtains a second time interval includes: The first terminal device determines, based on a QoS parameter of a third service and a correspondence between a time interval and a QoS parameter, the second time interval corresponding to the QoS parameter of the third service, where the third service is a service to be transmitted on the first resource by the second terminal device.

In a possible design, the first resource is a resource reserved by the second terminal device. That the first terminal device obtains a second time interval includes: The first terminal device receives a scheduling assignment (SA) from the second terminal device, where the SA includes the second time interval.

In a possible design, the first resource is a resource reserved by the second terminal device. That the first terminal device obtains a fourth time interval includes: The first terminal device receives the fourth time interval from the network device; or the first terminal device obtains the fourth time interval preconfigured by the first terminal device.

In a possible design, the first resource is a resource reserved for the first service. The resource preemption method provided in this embodiment of this application further includes: The first terminal device obtains a third time interval and a fourth time interval, where the third time interval is a time interval between a current moment and a start moment of the first resource, and the fourth time interval is a time interval corresponding to the second time interval. The first terminal device cancels or determines to retain a sidelink buffer status report or a scheduling request according to a fourth preset rule, where the fourth preset rule is determined based on the third time interval and the fourth time interval.

In a possible design, the fourth preset rule includes: When the third time interval is less than the fourth time interval, the first terminal device determines to retain the sidelink buffer status report or the scheduling request.

In a possible design, the first resource is a resource reserved for the first service. The resource preemption method provided in this embodiment of this application further includes: The first terminal device releases or determines to retain the first resource according to a fifth preset rule, where the fifth preset rule is determined based on the third time interval and the fourth time interval.

In a possible design, the fifth preset rule includes: When the third time interval is greater than or equal to the fourth time interval, and the first terminal device obtains information about a resource scheduled by a network device for the first terminal device, the first terminal device releases the first resource, or the first terminal device determines to send data of the first service on the first resource. According to this solution, after preempting the first resource, the first terminal device may further determine security of the first resource, determine to use the first resource to transmit the second service only when the first resource is secure, and cancel the SR or BSR triggered on the sidelink. Alternatively, the first terminal device may release the preempted resource, to coordinate resources in a scenario in which a scheduling mode and an autonomous mode coexist. This improves resource utilization and reduces a waste of resources.

In a possible design, the first resource is a resource reserved for the first service. That the first terminal device obtains a second time interval includes: The first terminal device determines, based on a QoS parameter of the first service and a correspondence between a time interval and a QoS parameter, the second time interval corresponding to the QoS parameter of the first service.

In a possible design, that the first terminal device obtains a fourth time interval includes: The first terminal device determines, based on a QoS parameter of the second service and the correspondence between a time interval and a QoS parameter, the fourth time interval corresponding to the QoS parameter of the second service.

In a possible design, the second time interval is configured by a network device, or the second time interval is preconfigured by the first terminal device. That the first terminal device obtains a fourth time interval includes: The first terminal device determines the second time interval as the fourth time interval.

In a possible design, the resource preemption method provided in this embodiment of this application further includes: the first terminal device sends a preemption message. The preemption message includes an area identifier of the first terminal device; the preemption message is scrambled by using the area identifier of the first terminal device; or the preemption message includes a speed threshold and a speed at which the first terminal device sends the preemption message.

According to a second aspect, a communications apparatus is provided, configured to implement the foregoing methods. The communications apparatus may be the first terminal device in the first aspect, for example, an in-vehicle communications apparatus; an apparatus including the first terminal device, for example, any type of vehicle; or an apparatus included in the first terminal device, for example, a system chip. The communications apparatus includes a module, a unit, or a means for implementing the methods. The module, the unit, or the means may be implemented by hardware or software, or by corresponding software executed by hardware. The hardware or the software includes one or more modules or units corresponding to the function.

According to a third aspect, a communications apparatus is provided, including a processor and a memory. The memory is configured to store computer instructions, and when the processor executes the instructions, the communications apparatus is enabled to perform the method according to any one of the foregoing aspects. The communications apparatus may be the first terminal device in the first aspect, for example, an in-vehicle communications apparatus; an apparatus including the first terminal device, for example, any type of vehicle; or an apparatus included in the first terminal device, for example, a system chip.

According to a fourth aspect, a communications apparatus is provided, and includes a processor. The processor is coupled to a memory, and is configured to: after reading instructions from the memory, perform the method in any one of the foregoing aspects according to the instructions. The communications apparatus may be the first terminal device in the first aspect, for example, an in-vehicle communications apparatus; an apparatus including the first terminal device, for example, any type of vehicle; or an apparatus included in the first terminal device, for example, a system chip.

According to a fifth aspect, a computer-readable storage medium is provided. The computer-readable storage medium stores instructions. When the instructions are run on a communications apparatus, the communications apparatus is enabled to perform the method in any one of the foregoing aspects. The communications apparatus may be the first terminal device in the first aspect, for example, an in-vehicle communications apparatus; an apparatus including the first terminal device, for example, any type of vehicle; or an apparatus included in the first terminal device, for example, a system chip.

According to a sixth aspect, a computer program product including instructions is provided. When the instructions are run on a communications apparatus, the communications apparatus is enabled to perform the method in any one of the foregoing aspects. The communications apparatus may be the first terminal device in the first aspect, for example, an in-vehicle communications apparatus; an apparatus including the first terminal device, for example, any type of vehicle; or an apparatus included in the first terminal device, for example, a system chip.

According to a seventh aspect, a communications apparatus (for example, the communications apparatus may be a chip or a chip system) is provided. The communications apparatus includes a processor, configured to implement the functions in any one of the foregoing aspects. In a possible design, the communications apparatus further includes a memory, where the memory is configured to store necessary program instructions and data. When the communications apparatus is the chip system, the communications apparatus may include a chip, or may include a chip and another discrete component.

For technical effects achieved in any one of the design manners of the second aspect to the seventh aspect, refer to technical effects achieved in the different design manners of the first aspect.

According to an eighth aspect, a communications system is provided. The communications system includes the first terminal device according to the foregoing aspects.

DESCRIPTION OF EMBODIMENTS

For ease of understanding of technical solutions in embodiments of this application, the following first briefly describes technologies or names related to this application.

1. Vehicle-to-Everything.

Vehicle-to-everything (V2X) is communication between a vehicle and the outside world based on various communications technologies by using an apparatus (such as a sensor or a vehicle-mounted terminal) configured on the vehicle. For example, V2X may incorporate specific types of communication such as vehicle-to-vehicle (V2V), vehicle-to-pedestrian (V2P), vehicle-to-vehicle infrastructure (V2I), vehicle-to-network (V2N), and the like. V2X may be applied in such fields as car sharing and intelligent network driving (IND).

2. Scheduling Mode.

In the embodiments of this application, in the scheduling mode, when transmitting data on a sidelink (SL), a terminal device needs to report a buffer status report (BSR) on the sidelink (SL) to a network device by using an uplink resource, to request the network device to schedule a sidelink resource for the terminal device. When there is no available uplink resource for the terminal device to report the BSR, the terminal device triggers a scheduling request (SR), to request the uplink resource for reporting the BSR. In this case, the triggered scheduling request is in a suspended state.

The following describes technical solutions in the embodiments of this application with reference to the accompanying drawings in the embodiments of this application. In the descriptions of this application, "/" represents an "or" relationship between associated objects, unless otherwise specified. For example, AB may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two, unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, for convenience of clear description in the embodiments of this application, terms such as "first", "second", and the like are used to distinguish between same objects or similar objects whose functions and purposes are basically the same. Persons skilled in the art may understand that the terms such as "first" and "second" do not limit a quantity or an execution sequence, and the terms such as "first" and "second" do not indicate a definite difference.

Figure 1:
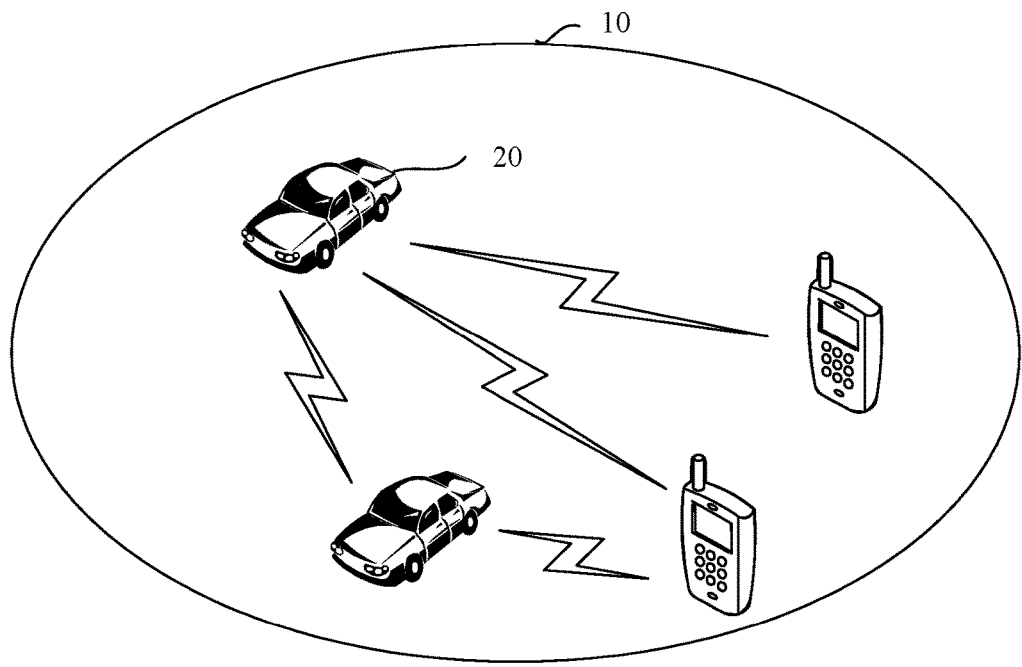
FIG. 1 is a schematic diagram depicting a structure of a communications system according to an embodiment of this application.

FIG. 1 shows a communications system 10 according to an embodiment of this application. The communications system 10 includes a plurality of terminal devices, and the plurality of terminal devices include a first terminal device 20. Optionally, any two terminal devices in the plurality of terminal devices can communicate with each other.

Optionally, the first terminal device 20 in this embodiment of this application may be a vehicle, or a vehicle-mounted terminal installed on the vehicle for assisting in driving of the vehicle, or a chip in the vehicle-mounted terminal. Alternatively, the terminal device in this embodiment of this application may be a device for implementing a wireless communications function, such as a terminal or a chip that may be used in the terminal. The vehicle-mounted terminal or the terminal may be user equipment (UE), an access terminal, a terminal unit, a terminal station, a mobile station, a remote station, a remote terminal, a mobile device, a wireless communications device, a terminal agent, a terminal apparatus, or the like in a fifth generation (5G) network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communications function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The vehicle-mounted terminal may be mobile or fixed, and the terminal may be mobile or fixed.

Optionally, the first terminal device 20 in this embodiment of this application may also be referred to as a communications device (or a communications apparatus). The first terminal device 20 may be a general-purpose device or a dedicated device. This is not specifically limited in this embodiment of this application.

Figure 2:
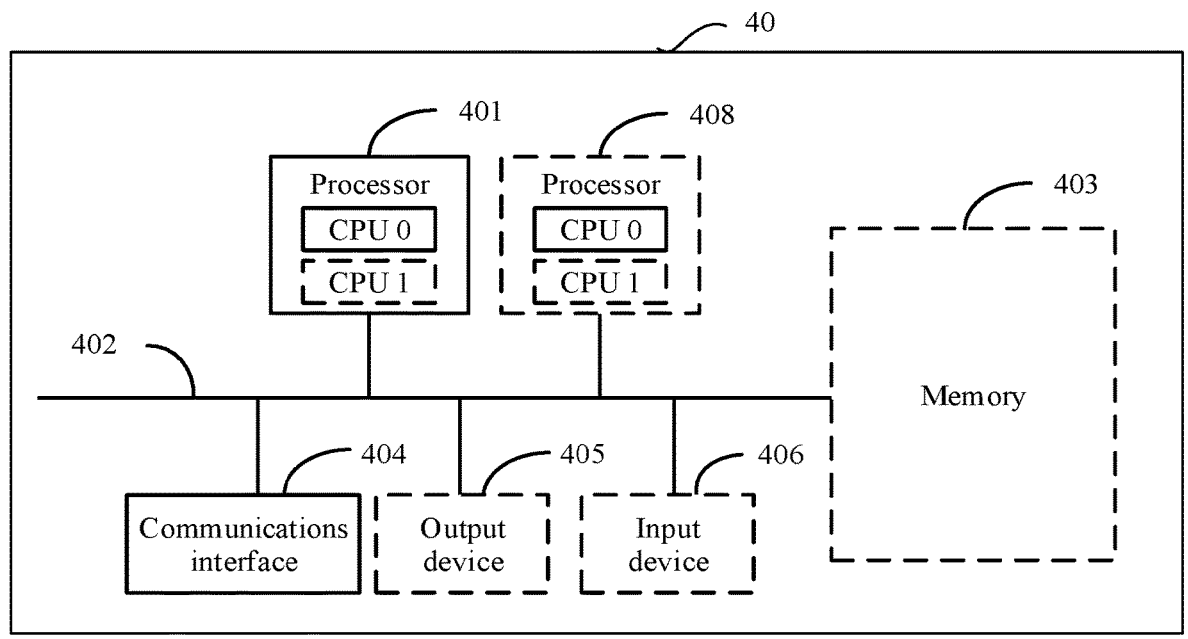
FIG. 2 is a schematic diagram depicting a structure of a first terminal device according to an embodiment of this application.

Optionally, in this embodiment of this application, the first terminal device 20 shown in FIG. 1 may be implemented by using a communications device (or a communications apparatus) 40 shown in FIG. 2. FIG. 2 is a schematic diagram depicting a structure of the communications device 40 according to an embodiment of this application. The communications device 40 includes one or more processors 401, a communications bus 402, and at least one communications interface (that the communications device 40 includes a communications interface 404 and one processor 401 is merely an example for description in FIG. 2). Optionally, the communications device 40 may further include a memory 403.

The processor 401 may be a general-purpose central processing unit (CPU), a microprocessor, an application-specific integrated circuit (ASIC), or one or more integrated circuits configured to control program execution of the solutions of this application.

The communications bus 402 may be a peripheral component interconnect (PCI) bus, an extended industry standard architecture (EISA) bus, or the like. The bus may be classified as an address bus, a data bus, a control bus, and the like. For ease of representation, only one thick line is used to represent the bus in FIG. 2, but this does not mean that there is only one bus or only one type of bus. The communications bus 402 is configured to connect different components in the communications device 40 for communication between the different components.

The communications interface 404 may be a transceiver module, configured to communicate with another device or a communications network, for example, the Ethernet, a radio access network (RAN), or a wireless local area network (WLAN). For example, the transceiver module may be an apparatus, for example, a transceiver. Optionally, the communications interface 404 may alternatively be a transceiver circuit located inside the processor 401, configured to input a signal into the processor and output a signal from the processor.

The memory 403 may be an apparatus having a storage function. The memory 403 may be, for example, a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or data structures and capable of being accessed by a computer, but is not limited thereto. The memory may be a standalone component, and may be connected to the processor through the communications bus 402. Alternatively, the memory may be integrated with the processor.

The memory 403 is configured to store computer-executable instructions for executing the solutions of this application, and the processor 401 controls the execution. The processor 401 is configured to execute the computer-executable instructions stored in the memory 403, to implement the resource preemption method provided in the embodiments of this application.

Alternatively, optionally, in this embodiment of this application, the processor 401 may perform processing-related functions in the resource preemption method provided in the following embodiments of this application, and the communications interface 404 is responsible for communication with another device or a communications network. This is not specifically limited in this embodiment of this application.

Optionally, the compute-executable instructions in the embodiments of this application may also be referred to as application program code. This is not specifically limited in the embodiments of this application.

During specific implementation, in an embodiment, the processor 401 may include one or more CPUs, for example, a CPU 0 and a CPU 1 shown in FIG. 2.

During specific implementation, in an embodiment, the communications device 40 may include a plurality of processors, for example, the processor 401 and a processor 408 in FIG. 2. Each of the processors may be a single-core (single-CPU) processor, or may be a multi-core (multi-CPU) processor. The processor herein may be one or more devices, circuits, and/or processing cores for processing data (for example, computer program instructions).

During specific implementation, in an embodiment, the communications device 40 may further include an output device 405 and an input device 406. The output device 405 communicates with the processor 401, and may display information in a plurality of manners. For example, the output device 405 may be a liquid crystal display (LCD), a light-emitting diode (LED) display, a cathode ray tube (CRT) display, a projector, or the like. The input device 406 communicates with the processor 401, and may receive an input of a user in a plurality of manners. For example, the input device 406 may be a mouse, a keyboard, a touchscreen device, or a sensor device.

Currently, in NR V2X communication, even if a terminal device that preempts a resource may send a preemption message to indicate a resource preempted by the terminal device, the resource may be still preempted by another terminal device. For example, when the terminal device preempts a resource to complete construction of a transport block, that is, when the terminal device sends the transport block on the preempted resource, the resource may be still occupied by another terminal device. In other words, the resource may be frequently preempted, and resource security is low. In view of this, the embodiments of this application provide a resource preemption method. In the resource preemption method, a first terminal device obtains a first time interval and a second time interval. The first time interval is a time interval related to a first resource. The second time interval is used to indicate a preemption forbidden time. The first resource is a resource reserved by a second terminal device or the first resource is a resource reserved for a first service to be transmitted by the first terminal device. A priority of the first service is lower than a priority of a second service to be transmitted by the first terminal device. The first terminal device preempts or determines not to preempt the first resource according to a first preset rule, where the first preset rule is determined based on the first time interval and the second time interval. In the embodiments of this application, when the first terminal device determines that the first resource can be preempted but the first terminal device has not started a preemption process, the first terminal device needs to obtain the first time interval and the second time interval, and preempt or determine not to preempt the first resource (does not execute a preemption process) according to the first preset rule. This can prevent the first terminal device from arbitrarily preempting the first resource, reduce a quantity of times of frequent resource preemption, and improve resource security. With reference to the communications system shown in FIG. 1, the following describes in detail the resource preemption method provided in this application by using specific embodiments.

It should be noted that, in the following embodiments of this application, names of messages or names of parameters in messages between devices are merely examples, and the messages or the parameters may have other names in specific implementations. This is not specifically limited in the embodiments of this application.

It should be noted that, in the embodiments of this application, a priority of a to-be-transmitted service may also be understood as a priority of a data packet of the to-be-transmitted service, a resource is a sidelink resource, a predetermined resource may be understood as a reserved resource, unless otherwise specified. The general descriptions are provided herein, and are not repeated in the following embodiments.

It should be noted that, in the embodiments of this application, the first terminal device may preempt a resource reserved by another terminal device, or a high-priority service of the first terminal device may preempt a resource reserved for a low-priority service of the first terminal device. In the embodiments of this application, a service for which a resource has been reserved by the first terminal device is referred to as the first service to be transmitted by the first terminal device, and a service to be transmitted on a resource obtained by the first terminal device in a current preemption process is referred to as the second service to be transmitted by the first terminal device. A priority of the first service is lower than a priority of the second service. In addition, in the embodiments of this application, it is not limited that the first terminal device needs to have a first service. When the first terminal device only needs to have a to-be-transmitted service on a resource obtained in the current preemption process, the to-be-transmitted service may also be referred to as a second service. The general descriptions are provided herein, and are not repeated in the following embodiments.

Figure 3:
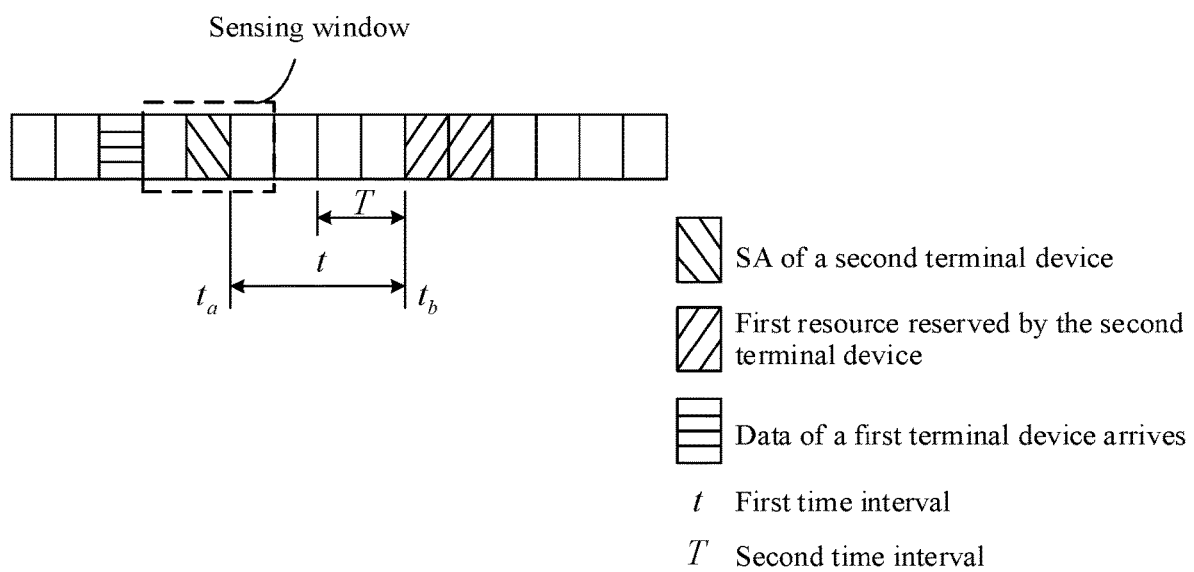
FIG. 3 is a schematic diagram of resource preemption moments according to an embodiment of this application.
Figure 4:
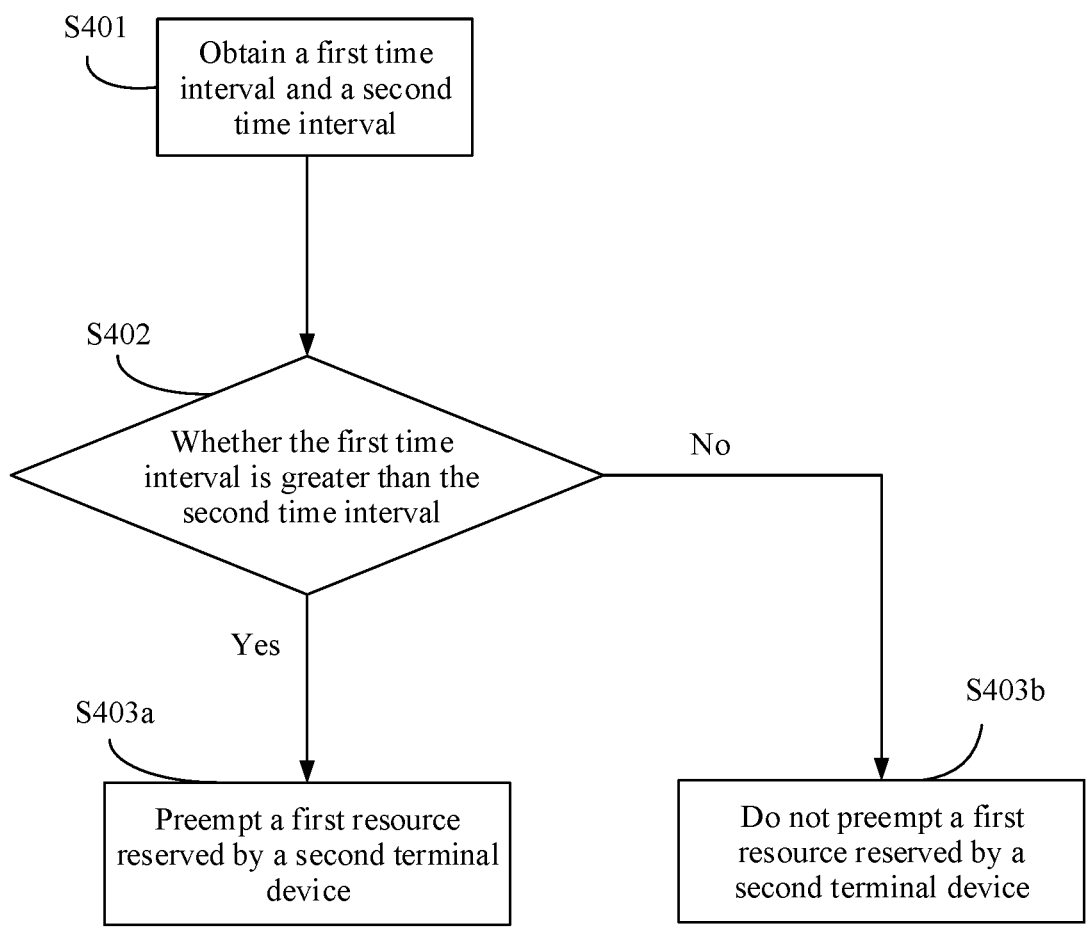
FIG. 4 is a schematic flowchart 1 of a resource preemption method according to an embodiment of this application.

In a possible implementation, descriptions are provided by using an example in which a first terminal device preempts a first resource reserved by a second terminal device, and the first terminal device is in an autonomous mode. As shown in FIG. 3, when determining that a second service needs to be transmitted, the first terminal device may autonomously select, according to a sensing mechanism, a resource to transmit the second service. In a sensing window, the first terminal device may decode a scheduling assignment (SA) sent by the second terminal device, to obtain a time-frequency position of the first resource reserved by the second terminal device and a priority of a service to be transmitted by the second terminal device on the first resource. When a priority of the second service to be transmitted by the first terminal device is higher than the priority of the service to be transmitted by the second terminal device on the first resource, a resource preemption method provided in an embodiment of this application may be performed. As shown in FIG. 4, the resource preemption method provided in this embodiment of this application includes the following steps.

S401: the first terminal device obtains a first time interval and a second time interval.

The first time interval is a time interval related to the first resource, the second time interval is used to indicate a preemption forbidden time, and the first resource is a resource reserved by the second terminal device.

Optionally, in this embodiment of this application, a start moment of the first time interval may be a moment at which the first terminal device decodes the SA of the second terminal device, and determines that the priority of the second service to be transmitted by the first terminal device is higher than the priority of the service to be transmitted on the first resource by the second terminal device. Alternatively, a start moment of the first time interval may be a moment at which the first terminal device obtains information about the first resource. Alternatively, a start moment of the first time interval may be an end moment of the SA of the second terminal device, for example, a moment $t_a$ shown in FIG. 3. In addition, an end moment of the first time interval may be a start moment of the first resource. For example, after decoding the SA of the second terminal device, the first terminal device may determine a time-frequency position of the first resource indicated in the SA, accordingly determine the start moment of the first resource, for example, a moment $t_b$ shown in FIG. 3, determine the end moment of the first time interval, and further determine the first time interval based on the start moment and the end moment.

Optionally, in this embodiment of this application, there may be a correspondence between the second time interval and a quality of service (QoS) parameter of a service. The correspondence may be explicit. For example, a QoS parameter 1 corresponds to a second time interval 1. Alternatively, the correspondence may be implicit, and a corresponding second time interval may be determined based on a QoS parameter of a service. This is not specifically limited in this embodiment of this application. The QoS parameter may be an identifier of a QoS flow, an identifier of a QoS feature parameter, a priority, or the like. Alternatively, optionally, in this embodiment of this application, the second time interval may be a fixed value. To be specific, a terminal device uses the fixed value as the second time interval each time the terminal device preempts a resource. The second time interval may be statically configured by a network device (that is, the network device configures the second time interval for the terminal device only once). The second time interval may alternatively be preconfigured by the terminal device. For example, the second time interval may be written into the terminal device in advance. All terminal devices may correspond to a same fixed second time interval or different fixed second time intervals. This is not specifically limited in this embodiment of this application. Alternatively, optionally, in this embodiment of this application, the second time interval may be dynamically configured by the network device. To be specific, the network device may separately configure a second time interval for the terminal device each time, and a second time interval used each time the terminal device preempts a resource may be different. For example, the network device may configure a second time interval for the terminal device each time the terminal device preempts a resource. It should be noted that a specific scenario in which the network device dynamically configures the second time interval for the terminal device is not limited in this embodiment of this application.

It should be noted that second time intervals configured by the network device for all terminal devices may be the same or different. For example, the network device may configure a same second time interval for all the terminal devices, and the same time interval is used when each terminal device preempts a resource. Alternatively, the network device may configure different second time intervals for different terminal devices, and each terminal device uses a second time interval corresponding to the terminal device when preempting a resource. For example, if the network device configures a second time interval T1 for a terminal device 1, and configures a second time interval T2 for a terminal device 2, the terminal device 1 uses the second time interval T1 when preempting a resource, and the terminal device 2 uses the second time interval T2 when preempting a resource.

Optionally, in this embodiment of this application, based on the representation manners of the second time interval, the first terminal device may directly obtain the second time interval, or may indirectly derive a corresponding second time interval. For example, the first terminal device may obtain the second time interval in the following four manners.

Manner 1: after determining a QoS parameter of a third service, the first terminal device determines, based on the QoS parameter of the third service and a correspondence between a time interval and a QoS parameter, a second time interval corresponding to the QoS parameter of the third service. The third service is a service to be transmitted on the first resource by the second terminal device, and the correspondence between a time interval and a QoS parameter may be configured by the network device. This is not specifically limited in this embodiment of this application.

Optionally, when there is a correspondence between the second time interval and a QoS parameter of a service, the first terminal device may obtain the second time interval in Manner 1. For example, the first terminal device may obtain, by decoding the SA of the second terminal device, the QoS parameter of the third service included in the SA. After obtaining the QoS parameter of the third service, the first terminal device may derive the second time interval or calculate the second time interval based on the correspondence between a time interval and a QoS parameter.

Manner 2: the first terminal device obtains the second time interval configured by the network device.

Optionally, in this embodiment of this application, the first terminal device may obtain the second time interval statically configured by the network device. For example, when the first terminal device obtains a current second time interval, the first terminal device may receive, from the network device, a static configuration message that carries the second time interval, and obtain the second time interval included in the static configuration message. Alternatively, before obtaining a current second time interval, the first terminal device has received, from the network device, a static configuration message that carries the second time interval, and stores the second time interval as a fixed second time interval. When currently and subsequently preempting a resource, the first terminal device may obtain the stored fixed second time interval.

Alternatively, optionally, in this embodiment of this application, the first terminal device may obtain the second time interval dynamically configured by the network device. For example, when the first terminal device obtains a current second time interval, the first terminal device may send a request message to the network device, to request the network device to configure a second time interval for the first terminal device. After receiving the request message, the network device may deliver a second time interval to the first terminal device. Alternatively, the network device may periodically send a dynamic configuration message to the terminal device to configure the second time interval. When obtaining a current second time interval, the first terminal device may obtain a second time interval most recently configured by the network device. This is not specifically limited in this embodiment of this application.

Manner 3: the first terminal device obtains the second time interval preconfigured by the first terminal device.

Optionally, in this embodiment of this application, the first terminal device may preconfigure the second time interval. For example, the second time interval may be written into the first terminal device in advance. When obtaining a current second time interval, the first terminal device may obtain the pre-written second time interval.

Manner 4: the first terminal device obtains the second time interval included in the SA of the second terminal device.

Optionally, in this embodiment of this application, the second terminal device may send the SA including the second time interval corresponding to the second terminal device, so that a terminal device that decodes the SA can obtain the second time interval. Therefore, the first terminal device may receive the SA of the second terminal device, and obtain the second time interval from the SA after decoding the SA of the second terminal device.

Optionally, before sending the second time interval included in the SA, the second terminal device may obtain the second time interval corresponding to the second terminal device in Manner 1, Manner 2, or Manner 3, and then send the second time interval included in the SA of the second terminal device.

After obtaining the first time interval and the second time interval, the first terminal device may preempt or determine not to preempt the first resource according to a first preset rule, where the first preset rule is determined based on the first time interval and the second time interval. Specifically, the first preset rule includes: When the first time interval is greater than the second time interval, the first terminal device preempts the first resource; or when the first time interval is less than or equal to the second time interval, the first terminal device determines not to preempt the first resource.

Optionally, that the first terminal device preempts or determines not to preempt the first resource according to a first preset rule may include the following steps S402 and S403a, or may include the following steps S402 and S403b.

S402: the first terminal device determines whether the first time interval is greater than the second time interval.

Optionally, in this embodiment of this application, if the first terminal device determines that the first time interval is greater than the second time interval, the first terminal device performs step S403a; or if the first terminal device determines that the first time interval is less than or equal to the second time interval, the first terminal device performs step S403b.

Step S403a is specifically.

S403a: the first terminal device preempts the first resource.

When the first terminal device determines that the first time interval is greater than the second time interval, that is, the start moment of the first time interval falls beyond the preemption forbidden time, the first terminal device preempts the first resource. For example, as shown in FIG. 3, if a start moment $t_a$ of the first time interval is not included in a second time interval T, the first terminal device preempts the first resource reserved by the second terminal device. For a method for preempting the first resource by the first terminal device, refer to the conventional technology. Details are not described in this embodiment of this application.

Step S403b is specifically.

S403b: the first terminal device determines not to preempt the first resource.

When the first terminal device determines that the first time interval is less than or equal to the second time interval, that is, the start moment of the first time interval falls within the preemption forbidden time, or the start moment of the first time interval overlaps a start moment of the second time interval, the first resource is disallowed to be preempted. Therefore, the first terminal device determines not to preempt the first resource.

According to the resource preemption method provided in this application, when the first time interval is greater than the second time interval, that is, the start moment of the first time interval falls beyond the preemption forbidden time, the first terminal device preempts the first resource according to the first preset rule. When the first time interval is less than or equal to the second time interval, that is, the start moment of the first time interval falls within the preemption forbidden time, the first terminal device determines not to preempt the first resource according to the first preset rule. This prevents the first terminal device from preempting the first resource, within the preemption forbidden time, that may be preempted by another terminal device. This reduces a quantity of times of frequent resource preemption, and improves resource security.

The processor 401 of the communications apparatus 40 shown in FIG. 2 may invoke the application program code stored in the memory 403, to instruct the terminal device to perform the actions of the first terminal device in steps S401 to S403a or steps S401 to S403b. This is not limited in this embodiment.

Figure 5:
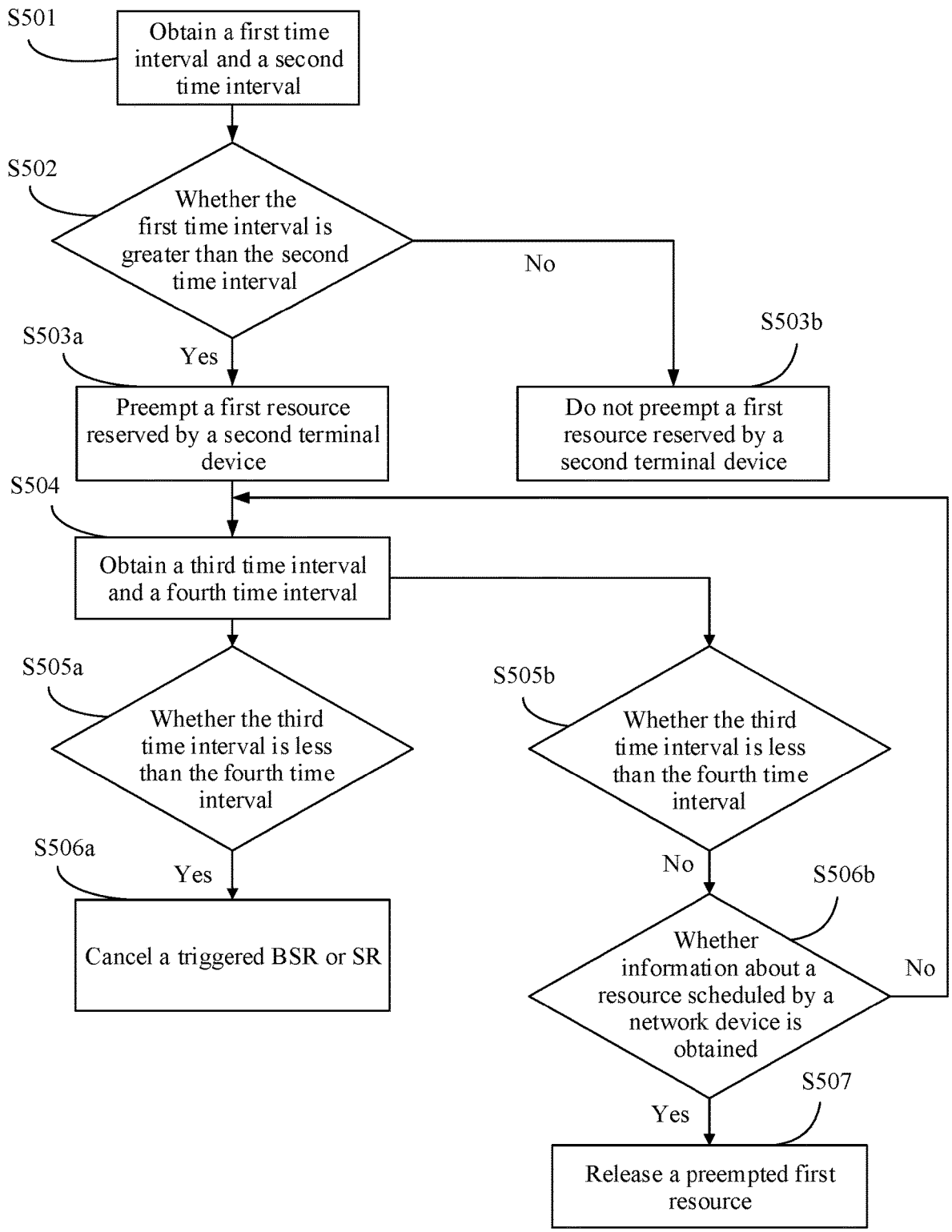
FIG. 5 is a schematic flowchart 2 of a resource preemption method according to an embodiment of this application.

The foregoing embodiment provides the resource preemption method applied in the scenario in which the first terminal device preempts a resource reserved by another terminal device and the first terminal device is in the autonomous mode. Further, the embodiments of this application further provide a resource preemption method applied in a scenario in which the first terminal device preempts a resource reserved by another terminal device and the first terminal device is in a joint mode combining a scheduling mode and the autonomous mode. When the first terminal device is in the joint mode, if a second service of the first terminal device triggers a BSR or an SR on a sidelink (SL), and the second service is delay-sensitive, the first terminal device cannot wait for a network device to schedule a resource to transmit the second service, the first terminal device may select a resource by using a resource preemption method provided in an embodiment of this application. As shown in FIG. 5, the resource preemption method provided in this embodiment of this application includes the following steps.

S501: the first terminal device obtains a first time interval and a second time interval.

Optionally, in this embodiment of this application, the first time interval is a time interval related to a first resource, the second time interval is used to indicate a preemption forbidden time, and the first resource is a resource reserved by a second terminal device. For related descriptions, refer to step S401. Details are not described herein again.

After obtaining the first time interval and the second time interval, the first terminal device may preempt or determine not to preempt the first resource according to a first preset rule, where the first preset rule is determined based on the first time interval and the second time interval. Specifically, the first preset rule includes: When the first time interval is greater than the second time interval, the first terminal device preempts the first resource; or when the first time interval is less than or equal to the second time interval, the first terminal device determines not to preempt the first resource.

Optionally, that the first terminal device preempts or determines not to preempt the first resource according to a first preset rule may include steps S502 and S503a or steps S502 and S503b.

S502: the first terminal device determines whether the first time interval is greater than the second time interval.

Optionally, in this embodiment of this application, if the first terminal device determines that the first time interval is greater than the second time interval, the first terminal device performs step S503a. Alternatively, if the first terminal device determines that the first time interval is less than or equal to the second time interval, the first terminal device performs step S503b.

S503a: the first terminal device preempts the first resource.

For related descriptions, refer to step S403a. Details are not described herein again. Optionally, in this embodiment of this application, after performing step S503a, the first terminal device may perform steps S504 to S506a, or may perform steps S504 to S507.

S503b: the first terminal device determines not to preempt the first resource.

For related descriptions, refer to step S403b. Details are not described herein again.

Optionally, in this embodiment of this application, after preempting the first resource, the first terminal device may further determine whether the preempted first resource is secure, and may further perform the following steps S504 to S506a, or may further perform the following steps S504 to S507.

S504: the first terminal device obtains a third time interval and a fourth time interval.

The third time interval is a time interval between a current moment and a start moment of the first resource, the fourth time interval is used to indicate the preemption forbidden time, and the fourth time interval corresponds to the second time interval. After the first terminal device preempts the first resource, the first resource becomes a resource reserved by the first terminal device. In this case, if another terminal device preempts the first resource, the first terminal device is a preempted party, and the another terminal device needs to determine, by using the first terminal device as a reference, whether the first resource preempted by the first terminal device can be preempted. Alternatively, if another service of the first terminal device preempts the first resource, the first terminal device needs to determine, by using the first terminal device or the second service of the first terminal device as a reference, whether the first resource preempted by the second service of the first terminal device can be preempted. For example, the fourth time interval may be a time interval corresponding to a QoS parameter associated with the second service.

Optionally, in this embodiment of this application, the current moment may be a moment at which the first terminal device determines that the third time interval needs to be obtained. Alternatively, the current moment may be a moment at which the first terminal device determines whether the first resource needs to be released. Alternatively, the current moment may be a moment at which the first terminal device determines whether a triggered SR or SL BSR needs to be canceled. Alternatively, the current moment may be a moment at which the first terminal device receives information about a sidelink resource allocated by a network device. In addition, after decoding an SA of the second terminal device, the first terminal device may determine a time-frequency position of the first resource indicated in the SA. Accordingly, the first terminal device may determine the start moment of the first resource, and further determine the third time interval.

Optionally, in this embodiment of this application, a manner of obtaining the fourth time interval by the first terminal device varies with a manner of obtaining the second time interval by the first terminal device. Each manner of obtaining the second time interval corresponds to a manner of obtaining the fourth time interval. To be specific, when obtaining the second time interval in Manner 1, the first terminal device obtains the fourth time interval in a manner corresponding to Manner 1. Other cases are similar. Optionally, the four manners of obtaining the second time interval described in step S401 respectively correspond to the following four manners of obtaining the fourth time interval.

Manner 1: after determining a QoS parameter of the second service, the first terminal device determines, based on the QoS parameter of the second service and a correspondence between a time interval and a QoS parameter, the fourth time interval corresponding to the QoS parameter of the second service. The correspondence between a time interval and a QoS parameter may be configured by the network device. This is not specifically limited in this embodiment of this application.

Manner 2: the first terminal device uses, as the fourth time interval, the second time interval that is configured by the network device and that is obtained in step S401.

Manner 3: the first terminal device uses, as the fourth time interval, the second time interval that is preconfigured by the first terminal device and that is obtained in step S401.

Manner 4: the first terminal device receives the fourth time interval from the network device, or the first terminal device obtains the fourth time interval preconfigured by the first terminal device.

Optionally, in this embodiment of this application, the second time interval obtained by the first terminal device in Manner 4 in step S401 is the second time interval corresponding to the second terminal device. Therefore, after the first terminal device preempts the first resource, the second time interval corresponding to the first terminal device needs to be used as the fourth time interval. The first terminal device may obtain, in Manner 2 and Manner 3 in step S401, the second time interval corresponding to the first terminal device, and therefore the first terminal device may use the second time interval obtained in Manner 2 or Manner 3 as the fourth time interval, that is, the first terminal device receives the fourth time interval from the network device. Alternatively, the first terminal device obtains the fourth time interval preconfigured by the first terminal device.

Optionally, after obtaining the third time interval and the fourth time interval, the first terminal device may cancel or determine to retain a sidelink buffer status report or a scheduling request according to a second preset rule, where the second preset rule is determined based on the third time interval and the fourth time interval.

Optionally, the second preset rule includes: When the third time interval is less than the fourth time interval, the first terminal device cancels the sidelink buffer status report or the scheduling request. Alternatively, the second preset rule may include: When the third time interval is less than the fourth time interval, the first terminal device determines to retain the sidelink buffer status report or the scheduling request.

Optionally, after obtaining the third time interval and the fourth time interval, the first terminal device may further release or determine to retain the first resource according to a third preset rule, where the third preset rule is determined based on the third time interval and the fourth time interval.

Optionally, the third preset rule includes: When the third time interval is greater than or equal to the fourth time interval, and the first terminal device obtains information about a resource scheduled by the network device for the first terminal device, the first terminal device releases the first resource. Alternatively, the third preset rule may include: When the third time interval is greater than or equal to the fourth time interval, and the first terminal device obtains information about a resource scheduled by the network device for the first terminal device, the first terminal device determines to retain the first resource.

Optionally, when the second preset rule includes that the first terminal device cancels the sidelink buffer status report or the scheduling request when the third time interval is less than the fourth time interval, that the first terminal device cancels or determines to retain the sidelink buffer status report or the scheduling request according to the second preset rule may include the following steps S505a and S506a.

S505a: the first terminal device determines whether the third time interval is less than the fourth time interval.

Optionally, in this embodiment of this application, if the first terminal device determines that the third time interval is less than the fourth time interval, the first terminal device performs step S506a. In this case, correspondingly, if the first terminal device determines that the third time interval is greater than or equal to the fourth time interval, the first terminal device may determine to retain the sidelink buffer status report or the scheduling request.

S506a: The first terminal device cancels the sidelink BSR triggered by the first terminal device or the SR in a suspended state.

After the first terminal device preempts the first resource, if another terminal device or another service of the first terminal device also preempts the first resource, due to clock synchronization of all terminal devices, when the third time interval obtained by the first terminal device is less than the fourth time interval, that is, when a start moment of the third time interval determined by the first terminal device falls within the fourth time interval (the preemption forbidden time), the another terminal device determines that a start moment for preempting the first resource also falls within the fourth time interval (the preemption forbidden time). In this case, the another terminal device cannot preempt the first resource, and therefore the first resource preempted by the first terminal device is secure. When determining that the first resource is secure, the first terminal device may determine to use the preempted first resource to transmit the to-be-transmitted second service, and the first terminal device may further cancel the triggered sidelink BSR used to request the network device to schedule a resource, or cancel the SR in the suspended state.

Optionally, when the second preset rule includes that the first terminal device determines to retain the sidelink buffer status report or the scheduling request when the third time interval is less than the fourth time interval, if the first terminal device determines that the third time interval is less than the fourth time interval, the first terminal device may determine to retain the sidelink buffer status report or the scheduling request. Alternatively, if the first terminal device determines that the third time interval is greater than or equal to the fourth time interval, the first terminal device also determines to retain the sidelink buffer status report or the scheduling request.

Optionally, when the third preset rule includes that the first terminal device releases the first resource when the third time interval is greater than or equal to the fourth time interval and the first terminal device obtains information about a resource scheduled by the network device for the first terminal device, that the first terminal device releases or determines to retain the first resource according to the third preset rule may include the following steps S505b to S507.

S505b: the first terminal device determines whether the third time interval is less than the fourth time interval.

Optionally, in this embodiment of this application, if the first terminal device determines that the third time interval is greater than or equal to the fourth time interval, the first terminal device performs step S506b. In this case, correspondingly, if the first terminal device determines that the third time interval is less than the fourth time interval, the first terminal device may determine to retain the first resource.

S506b: the first terminal device determines whether the information about the resource scheduled by the network device is obtained.

After the first terminal device preempts the first resource, if another terminal device or another service of the first terminal device also preempts the first resource, due to clock synchronization of all the terminal devices, when the third time interval obtained by the first terminal device is greater than or equal to the fourth time interval, that is, when a start moment of the third time interval determined by the first terminal device falls beyond the fourth time interval (the preemption forbidden time), the another terminal device determines that a start moment for preempting the first resource also falls beyond the fourth time interval (the preemption forbidden time). In this case, the another terminal device can preempt the first resource, that is, the first resource is possibly be preempted by another terminal device, and therefore the first resource is not secure. In this case, if the first terminal device fails to obtain the information about the resource scheduled by the network device for the first terminal device, the first terminal device performs the resource preemption method provided in this application starting from step S504 until the third time interval is less than the fourth time interval or until the first terminal device obtains the information about the resource scheduled by the network device for the first terminal device. Alternatively, if the first terminal device has obtained the information about the resource scheduled by the network device for the first terminal device, the first terminal device performs step S507.

S507: after determining that the resource scheduled by the network device is obtained, the first terminal device releases the preempted first resource.

Optionally, in this scenario, after the first terminal device obtains the information about the resource scheduled by the network device for the first terminal device, the first terminal device may determine to transmit the second service on the resource scheduled by the network device, and release the preempted first resource.

Optionally, when the third preset rule includes that the first terminal device determines to retain the first resource when the third time interval is greater than or equal to the fourth time interval, and the first terminal device obtains the information about the resource scheduled by the network device for the first terminal device, if the first terminal device determines that the third time interval is greater than or equal to the fourth time interval, and the first terminal device obtains the information about the resource scheduled by the network device for the first terminal device, the first terminal device determines to retain the first resource. In this case, correspondingly, if the first terminal device determines that the third time interval is less than the fourth time interval, and the first terminal device obtains the information about the resource scheduled by the network device for the first terminal device, the first terminal device releases the first resource.

According to the resource preemption method provided in this application, when the first time interval is greater than the second time interval, that is, the start moment of the first time interval falls beyond the preemption forbidden time, the first terminal device preempts the first resource. When the first time interval is less than or equal to the second time interval, that is, the start moment of the first time interval falls within the preemption forbidden time, the first terminal device does not preempt the first resource. This prevents the first terminal device from preempting the first resource, within the preemption forbidden time, that may be preempted by another terminal device. This reduces a quantity of times of frequent resource preemption, and improves resource security. In addition, when the first terminal device is in the joint mode, after preempting the first resource, the first terminal device may further determine security of the first resource, determine to use the first resource to transmit the second service only when the first resource is secure, and cancel the triggered SR or BSR on the sidelink. Alternatively, the first terminal device may release the preempted resource, to coordinate resources in the scenario in which the scheduling mode and the autonomous mode coexist. This improves resource utilization and reduces a waste of resources.

The processor 401 of the communications apparatus 40 shown in FIG. 2 may invoke the application program code stored in the memory 403, to instruct the first terminal device to perform the actions of the first terminal device in steps S501 to S503b or steps S501 to S506a or steps S501 to S507. This is not limited in this embodiment.

Figure 6:
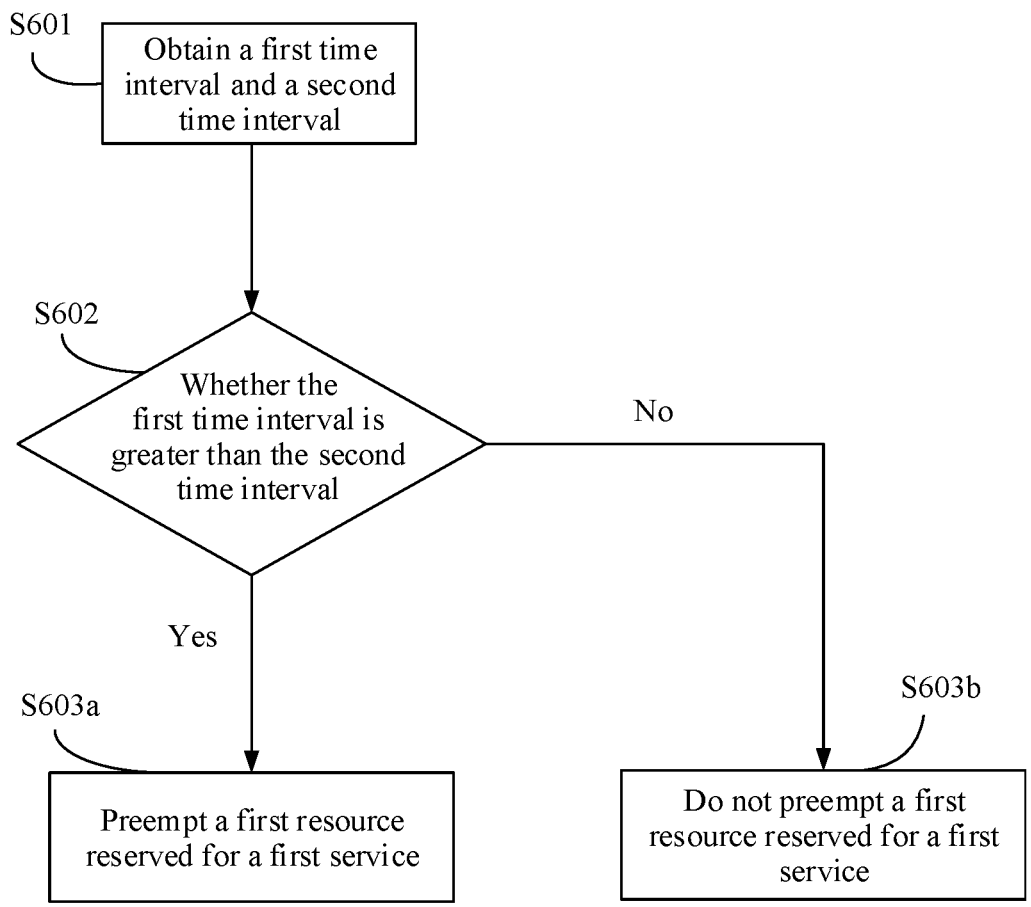
FIG. 6 is a schematic flowchart 3 of a resource preemption method according to an embodiment of this application.

In another possible implementation, descriptions are provided by using an example in which a first terminal device preempts a first resource reserved for a first service to be transmitted by the first terminal device, and the first terminal device is in an autonomous mode. When determining that a second service needs to be transmitted, the first terminal device may autonomously select, according to a sensing mechanism, a resource to transmit the second service. As shown in FIG. 6, a resource preemption method provided in an embodiment of this application includes the following steps.

S601: the first terminal device obtains a first time interval and a second time interval.

The first time interval is a time interval related to the first resource, the second time interval is used to indicate a preemption forbidden time, and the first resource is a resource reserved for the first service.

Optionally, in this embodiment of this application, a start moment of the first time interval may be a moment at which the first terminal device determines that a priority of the second service is higher than a priority of the first service. Alternatively, a start moment of the first time interval may be a moment at which the first terminal device further determines a time-frequency position of the first resource reserved for the first service after determining that a priority of the second service is higher than a priority of the first service. Alternatively, a start moment of the first time interval may be another moment. This is not specifically limited in this embodiment of this application. In addition, an end moment of the first time interval may be a start moment of the first resource. For example, the first terminal device may determine a time-frequency position of the first resource reserved for the first service, accordingly determine the start moment of the first resource, and further determine the first time interval.

Optionally, in this embodiment of this application, there may be a correspondence between the second time interval and a QoS parameter of a service. Alternatively, the second time interval may be a fixed value. Alternatively, the second time interval may be dynamically configured by a network device. For related descriptions, refer to the descriptions of the second time interval in step S401. Details are not described herein again. Optionally, in this embodiment of this application, based on the representation manners of the second time interval, the first terminal device may obtain the second time interval in the following three manners:

Manner 1: After determining a QoS parameter of the first service, the first terminal device determines, based on the QoS parameter of the first service and a correspondence between a time interval and a QoS parameter, the second time interval corresponding to the QoS parameter of the first service. The correspondence between a time interval and a QoS parameter may be configured by the network device. This is not specifically limited in this embodiment of this application.

Manner 2: the first terminal device obtains the second time interval configured by the network device.

For related descriptions, refer to Manner 2 in step S401. Details are not described herein again.

Manner 3: the first terminal device obtains the second time interval preconfigured by the first terminal device.

For related descriptions, refer to Manner 3 in step S401. Details are not described herein again.

After obtaining the first time interval and the second time interval, the first terminal device may preempt or determine not to preempt the first resource according to a first preset rule, where the first preset rule is determined based on the first time interval and the second time interval. Specifically, the first preset rule includes: When the first time interval is greater than the second time interval, the first terminal device preempts the first resource; or when the first time interval is less than or equal to the second time interval, the first terminal device determines not to preempt the first resource.

Optionally, that the first terminal device preempts or determines not to preempt the first resource according to a first preset rule may include steps S602 and S603a or steps S602 and S603b.

S602: the first terminal device determines whether the first time interval is greater than the second time interval.

Optionally, in this embodiment of this application, if the first terminal device determines that the first time interval is greater than the second time interval, the first terminal device performs step S603a. Alternatively, if the first terminal device determines that the first time interval is less than or equal to the second time interval, the first terminal device performs step S603b.

Step S603a is specifically.

S603a: the first terminal device preempts the first resource.

When the first terminal device determines that the first time interval is greater than the second time interval, that is, the start moment of the first time interval falls beyond the preemption forbidden time, the first terminal device preempts the first resource. For a method for preempting the first resource by the first terminal device, refer to the conventional technology. Details are not described in this embodiment of this application.

Step S603b is specifically.

S603b: the first terminal device determines not to preempt the first resource.

When the first terminal device determines that the first time interval is less than or equal to the second time interval, that is, the start moment of the first time interval falls within the preemption forbidden time, or the start moment of the first time interval overlaps a start moment of the second time interval, the first resource is disallowed to be preempted. Therefore, the first terminal device determines not to preempt the first resource.

According to the resource preemption method provided in this application, when the first time interval is greater than the second time interval, that is, the start moment of the first time interval falls beyond the preemption forbidden time, the first terminal device preempts the first resource according to the first preset rule. When the first time interval is less than or equal to the second time interval, that is, the start moment of the first time interval falls within the preemption forbidden time, the first terminal device determines not to preempt the first resource according to the first preset rule. This prevents the first terminal device from preempting the first resource, within the preemption forbidden time, that may be preempted by another service, reduces a quantity of times of frequent resource preemption, and improves resource security.

The processor 401 of the communications apparatus 40 shown in FIG. 2 may invoke the application program code stored in the memory 403, to instruct the first terminal device to perform the actions of the first terminal device in steps S601 to S603*a* or steps S601 to S603*b*. This is not limited in this embodiment.

Figure 7:
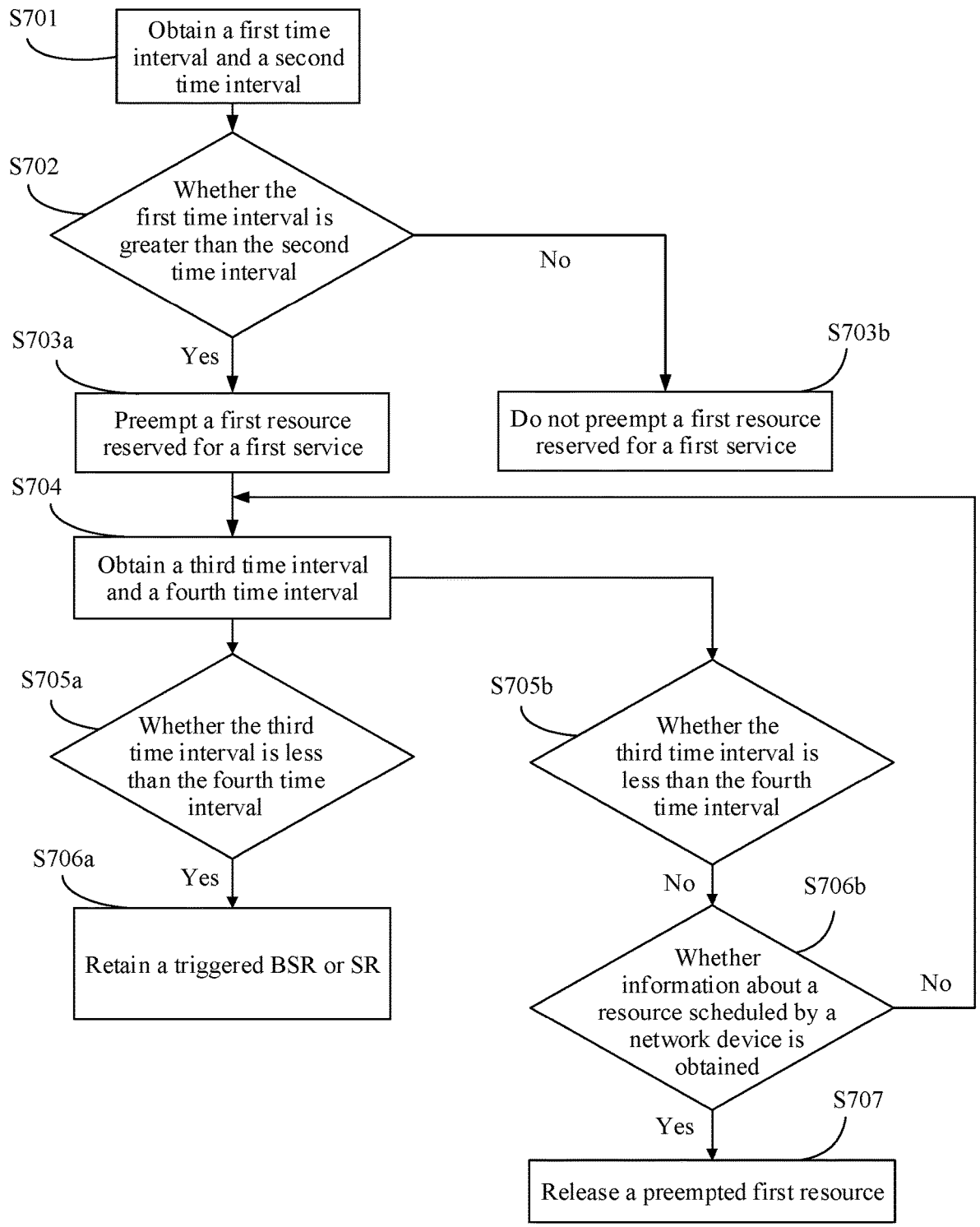
FIG. 7 is a schematic flowchart 4 of a resource preemption method according to an embodiment of this application.

The foregoing embodiment provides the resource preemption method applied in the scenario in which the first terminal device preempts a resource reserved for the first service and the first terminal device is in the autonomous mode. Further, the embodiments of this application further provide a resource preemption method applied in a scenario in which the first terminal device preempts a resource reserved for the first service and the first terminal device is in a joint mode combining a scheduling mode and the autonomous mode. When the first terminal device is in the joint mode, if a second service of the first terminal device triggers a BSR or an SR on an SL, and the second service is delay-sensitive, the first terminal device cannot wait for a network device to schedule a resource to transmit the second service, the first terminal device may select a resource by using a resource preemption method provided in an embodiment of this application. As shown in FIG. 7, the resource preemption method provided in this embodiment of this application includes the following steps.

S701: the first terminal device obtains a first time interval and a second time interval.

Optionally, in this embodiment of this application, the first time interval is a time interval related to a first resource, the second time interval is used to indicate a preemption forbidden time, and the first resource is a resource reserved for the first service to be transmitted by the first terminal device. For related descriptions, refer to step S401. Details are not described herein again.

After obtaining the first time interval and the second time interval, the first terminal device may preempt or determine not to preempt the first resource according to a first preset rule, where the first preset rule is determined based on the first time interval and the second time interval. Specifically, the first preset rule includes: When the first time interval is greater than the second time interval, the first terminal device preempts the first resource; or when the first time interval is less than or equal to the second time interval, the first terminal device determines not to preempt the first resource.

Optionally, that the first terminal device preempts or determines not to preempt the first resource according to a first preset rule may include steps S702 and S703*a* or steps S702 and S703*b*.

S702: the first terminal device determines whether the first time interval is greater than the second time interval.

Optionally, in this embodiment of this application, if the first terminal device determines that the first time interval is greater than the second time interval, the first terminal device performs step S703*a*. Alternatively, if the first terminal device determines that the first time interval is less than or equal to the second time interval, the first terminal device performs step S703*b*.

S703*a*: the first terminal device preempts the first resource.

For related descriptions, refer to step S403*a*. Details are not described herein again. Optionally, in this embodiment of this application, after performing step S703*a*, the first terminal device may perform steps S704 to S706*a*, or may perform steps S704 to S707.

S703*b*: the first terminal device determines not to preempt the first resource.

For related descriptions, refer to step S403*b*. Details are not described herein again.

Optionally, in this embodiment of this application, after preempting the first resource, the first terminal device may further determine whether the preempted first resource is secure, and may perform the following steps S704 to S706*a*, or may perform the following steps S704 to S707.

S704: the first terminal device obtains a third time interval and a fourth time interval.

The third time interval is a time interval between a current moment and a start moment of the first resource, the fourth time interval is used to indicate the preemption forbidden time, and the fourth time interval corresponds to the second time interval. After the first terminal device preempts the first resource, the first resource becomes a resource reserved for the second service of the first terminal device. In this case, if another terminal device preempts the first resource, the first terminal device is a preempted party, and the another terminal device needs to determine, by using the first terminal device as a reference, whether the first resource preempted for the second service by the first terminal device can be preempted. Alternatively, if another service of the first terminal device preempts the first resource, the first terminal device needs to determine, by using the first terminal device or the second service of the first terminal device as a reference, whether the first resource preempted by the second service of the first terminal device can be preempted.

Optionally, in this embodiment of this application, the current moment may be a moment at which the first terminal device determines that the third time interval needs to be obtained. Alternatively, the current moment may be a moment at which the first terminal device determines whether the first resource needs to be released. Alternatively, the current moment may be a moment at which the first terminal device determines whether a triggered SR or SL BSR needs to be canceled. Alternatively, the current moment may be a moment at which the first terminal device receives a sidelink resource allocated by a network device. In addition, the first resource is a resource reserved by the first terminal device or a resource allocated by the network device. When obtaining the resource, the first terminal device may determine the start moment of the first resource, and further determine the third time interval.

Optionally, in this embodiment of this application, a manner of obtaining the fourth time interval by the first terminal device varies with a manner of obtaining the second time interval by the first terminal device. Each manner of obtaining the second time interval corresponds to a manner of obtaining the fourth time interval. To be specific, when obtaining the second time interval in Manner 1, the first terminal device obtains the fourth time interval in a manner corresponding to Manner 1. Other cases are similar. Optionally, the four manners of obtaining the second time interval described in step S601 respectively correspond to the following four manners of obtaining the fourth time interval.

Manner 1: after determining a QoS parameter of the second service, the first terminal device determines, based on the QoS parameter of the second service and a correspondence between a time interval and a QoS parameter, the fourth time interval corresponding to the QoS parameter of the second service. The correspondence between a time interval and a QoS parameter may be configured by the network device. This is not specifically limited in this embodiment of this application.

Manner 2: the first terminal device uses, as the fourth time interval, the second time interval that is configured by the network device and that is obtained in step S601.

Manner 3: the first terminal device uses, as the fourth time interval, the second time interval that is preconfigured by the first terminal device and that is obtained in step S601.

Optionally, after obtaining the third time interval and the fourth time interval, the first terminal device may cancel or determine to retain a sidelink buffer status report or a scheduling request according to a fourth preset rule, where the fourth preset rule is determined based on the third time interval and the fourth time interval.

Optionally, the fourth preset rule includes: When the third time interval is less than the fourth time interval, the first terminal device determines to retain the sidelink buffer status report or the scheduling request. Alternatively, the fourth preset rule may include: When the third time interval is less than the fourth time interval, the first terminal device cancels the sidelink buffer status report or the scheduling request.

Optionally, after obtaining the third time interval and the fourth time interval, the first terminal device may further release or determine to retain the first resource according to a fifth preset rule, where the fifth preset rule is determined based on the third time interval and the fourth time interval.

Optionally, the fifth preset rule includes: When the third time interval is greater than or equal to the fourth time interval, and the first terminal device obtains information about a resource scheduled by the network device for the first terminal device, the first terminal device releases the first resource. Alternatively, the fifth preset rule may include: When the third time interval is greater than or equal to the fourth time interval, and the first terminal device obtains information about a resource scheduled by the network device for the first terminal device, the first terminal device determines to retain the first resource, and sends data of the first service.

Optionally, when the fourth preset rule includes that the first terminal device determines to retain the sidelink buffer status report or the scheduling request when the third time interval is less than the fourth time interval, that the first terminal device cancels or determines to retain the sidelink buffer status report or the scheduling request according to the fourth preset rule may include the following steps S705a and S706a.

S705a: the first terminal device determines whether the third time interval is less than the fourth time interval.

Optionally, in this embodiment of this application, if the first terminal device determines that the third time interval is less than the fourth time interval, the first terminal device performs step S706a; or if the first terminal device determines that the third time interval is greater than or equal to the fourth time interval, the first terminal device determines to also retain the sidelink buffer status report or the scheduling request.

S706a: the first terminal device determines to retain the sidelink BSR or the SR in a suspended state triggered by the first terminal device.

After the first terminal device preempts the first resource, if another terminal device or another service of the first terminal device also preempts the first resource, due to clock synchronization of all terminal devices, when the third time interval obtained by the first terminal device is less than the fourth time interval, that is, when a start moment of the third time interval determined by the first terminal device falls within the fourth time interval (the preemption forbidden time), the another terminal device determines that a start moment for preempting the first resource also falls within the fourth time interval (the preemption forbidden time). In this case, the another terminal device cannot preempt the first resource, and therefore the first resource preempted by the first terminal device is secure. When determining that the first resource is secure, the first terminal device may determine to use the preempted first resource to transmit the to-be-transmitted second service, and the first terminal device may further determine to reserve the triggered sidelink BSR used to request the network device to schedule a resource or the SR in the suspended state, and transmit the first service on the resource scheduled by the network device.

Optionally, when the fourth preset rule includes that the first terminal device cancels the sidelink buffer status report or the scheduling request when the third time interval is less than the fourth time interval, if the first terminal device determines that the third time interval is less than the fourth time interval, the first terminal device cancels the sidelink buffer status report or the scheduling request. In this case, correspondingly, if the first terminal device determines that the third time interval is greater than or equal to the fourth time interval, the first terminal device determines to retain the sidelink buffer status report or the scheduling request.

Optionally, when the fifth preset rule includes that the first terminal device releases the first resource when the third time interval is greater than or equal to the fourth time interval and the first terminal device obtains information about a resource scheduled by the network device for the first terminal device, that the first terminal device releases or determines to retain the first resource according to the fifth preset rule may include the following steps S705b to S507.

S705b: The first terminal device determines whether the third time interval is less than the fourth time interval.

Optionally, in this embodiment of this application, if the first terminal device determines that the third time interval is greater than or equal to the fourth time interval, the first terminal device performs step S706b. In this case, correspondingly, if the first terminal device determines that the third time interval is less than the fourth time interval, the first terminal device determines to retain the first resource. Optionally, the first terminal device may further transmit the first service by using the first resource.

S706b: the first terminal device determines whether the information about the resource scheduled by the network device is obtained.

After the first terminal device preempts the first resource, if another terminal device or another service of the first terminal device also preempts the first resource, due to clock synchronization of all the terminal devices, when the third time interval obtained by the first terminal device is greater than or equal to the fourth time interval, that is, when a start moment of the third time interval determined by the first terminal device falls beyond the fourth time interval (the preemption forbidden time), the another terminal device determines that a start moment for preempting the first resource also falls beyond the fourth time interval (the preemption forbidden time). In this case, the another terminal device can preempt the first resource, that is, the first resource is possibly be preempted by another terminal device, and therefore the first resource is not secure. In this case, if the first terminal device fails to obtain the information about the resource scheduled by the network device for the first terminal device, the first terminal device performs the resource preemption method provided in this application starting from step S704 until the third time interval is less than the fourth time interval or until the first terminal device obtains information about the resource scheduled by the network device for the first terminal device. Alternatively, if the first terminal device has obtained the information about the resource scheduled by the network device for the first terminal device, the first terminal device performs step S707.

S707: after determining that the resource scheduled by the network device is obtained, the first terminal device releases the preempted first resource.

Optionally, in this scenario, after the first terminal device obtains the information about the resource scheduled by the network device for the first terminal device, the first terminal device may determine to transmit the second service on the resource scheduled by the network device, and release the preempted first resource.

Optionally, when the fifth preset rule includes that the first terminal device determines to retain the first resource when the third time interval is greater than or equal to the fourth time interval, and the first terminal device obtains the information about the resource scheduled by the network device for the first terminal device, if the first terminal device determines that the third time interval is greater than or equal to the fourth time interval, the first terminal device determines to retain the first resource, and may further use the first resource to transmit the first service. In this case, correspondingly, if the first terminal device determines that the third time interval is less than the fourth time interval, and the first terminal device obtains the information about the resource scheduled by the network device for the first terminal device, the first terminal device releases the first resource.

According to the resource preemption method provided in this application, when the first time interval is greater than the second time interval, that is, a moment at which the first terminal device determines to preempt the first resource falls beyond the preemption forbidden time, the first terminal device preempts the first resource. When the first time interval is less than or equal to the second time interval, that is, a moment at which the first terminal device determines to preempt the first resource falls within the preemption forbidden time, the first terminal device does not preempt the first resource. This prevents the first terminal device from preempting the first resource, within the preemption forbidden time, that may be preempted by another terminal device. This reduces a quantity of times of frequent resource preemption, and improves resource security. In addition, when the first terminal device is in the joint mode, after preempting the first resource, the first terminal device may further determine security of the first resource, determine to use the first resource to transmit the second service only when the first resource is secure, and cancel the triggered SR or BSR on the sidelink. Alternatively, the first terminal device may release the preempted resource, to coordinate resources in the scenario in which the scheduling mode and the autonomous mode coexist. This improves resource utilization and reduces a waste of resources.

The processor 401 of the communications apparatus 40 shown in FIG. 2 may invoke the application program code stored in the memory 403, to instruct the first terminal device to perform the actions of the first terminal device in steps S701 to S703b or steps S701 to S706a or steps S701 to S707. This is not limited in this embodiment.

In addition, in the conventional technology, after successfully preempting a resource, a terminal device broadcasts a preemption message, and another terminal device that receives the preemption message may have a higher-priority service to be sent. Consequently, because the terminal device that needs to send the higher-priority service receives the preemption message, sufficient resources may not be selected for an even higher-priority service. In view this, after the first terminal device preempts the first resource, optionally, the resource preemption method shown in FIG. 4, FIG. 5, FIG. 6, or FIG. 7 provided in the embodiments of this application further includes the following steps.

When the first terminal device preempts the first resource reserved by the second terminal device, the first terminal device sends the preemption message only to the second terminal device.

Alternatively, optionally, the first terminal device may send the preemption message to a terminal within a specific geographical range, that is, an area identifier of the first terminal device is included in the preemption message. The first terminal device may scramble the preemption message by using the area identifier of the first terminal device. Therefore, after the another terminal device detects the preemption message, if the area identifier in the preemption message is the same as an area identifier corresponding to the another terminal device, the terminal device may receive the preemption message. Otherwise, the terminal device may discard the preemption message. Alternatively, the terminal device may descramble the preemption message by using an area identifier corresponding to the terminal device. If the terminal device can successfully descramble the preemption message, the terminal device receives the preemption message.

Alternatively, optionally, the first terminal device may send the preemption message to the terminal device within a specific speed range, that is, the preemption message includes a speed V and a speed threshold Tv of the first terminal device at a current moment. Therefore, after another terminal device detects the preemption message, if a current speed of the terminal device falls within a range [V−Tv, V+Tv], the terminal device receives the preemption message. Otherwise, the terminal device may discard the preemption message.

Alternatively, optionally, the first terminal device may send the preemption message to other terminal devices in a multicast group in which the first terminal device is located. Optionally, the first terminal device may send the preemption message to leader UE in the multicast group. The leader UE forwards the preemption message to the other terminal devices in the multicast group, or the leader UE forwards the preemption message to another terminal device not in the group, for example, leader UE in another multicast group. Alternatively, the first terminal device may directly multicast the preemption message to other terminal devices in the multicast group.

According to the resource preemption method provided in this embodiment of this application, the first terminal device is prevented from preempting the first resource, within the preemption forbidden time, that may be preempted by another terminal device. This reduces a quantity of times of frequent resource preemption, and improves resource security. In addition, if the first terminal device successfully preempts the first resource, the first terminal device may send the preemption message only to a terminal device from which the first terminal device preempts the first resource; or may send the preemption message to some terminal devices, without affecting another terminal device that has a higher-priority service to select a resource for transmission.

It may be understood that, in the foregoing embodiments, the methods and/or steps implemented by the first terminal device may alternatively be implemented by a component (for example, a chip or a circuit) that may be used in the first terminal device.

The solutions provided in the embodiments of this application are mainly described from a perspective of interaction between network elements. Correspondingly, the embodiments of this application further provide a communications apparatus. The communications apparatus is configured to implement the foregoing methods. The communications apparatus may be the first terminal device in the foregoing method embodiments, or an apparatus including the first terminal device, or a component that may be used in the first terminal device. It can be understood that, to implement the foregoing functions, the communications apparatus includes corresponding hardware structures and/or software modules for performing the functions. Persons skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely a logical function division. During actual implementation, division into the modules may be performed in another manner.

Figure 8:
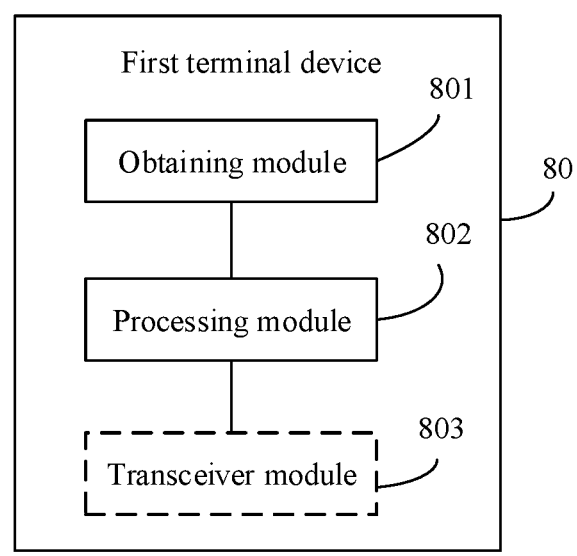
FIG. 8 is a schematic diagram depicting a structure of another first terminal device according to an embodiment of this application.

For example, the communications apparatus is the first terminal device in the foregoing method embodiments. FIG. 8 is a schematic diagram depicting a structure of a first terminal device 80. The first terminal device 80 includes an obtaining module 801 and a processing module 802. Optionally, the first terminal device 80 further includes a transceiver module 803. The transceiver module 803, also referred to as a transceiver unit, is configured to implement a sending function and/or a receiving function. For example, the transceiver module 803 may be a transceiver circuit, a transceiver, or a communications interface.

The obtaining module 801 is configured to obtain a first time interval and a second time interval. The first time interval is a time interval related to a first resource. The second time interval is used to indicate a preemption forbidden time. The first resource is a resource reserved by a second terminal device or the first resource is a resource reserved for a first service to be transmitted by the first terminal device. A priority of the first service is lower than a priority of a second service to be transmitted by the first terminal device. The processing module 802 is configured to preempt or determine not to preempt the first resource according to a first preset rule, where the first preset rule is determined based on the first time interval and the second time interval.

Optionally, the first resource is a resource reserved by the second terminal device. The obtaining module 801 is further configured to obtain a third time interval and a fourth time interval, where the third time interval is a time interval between a current moment and a start moment of the first resource, and the fourth time interval is a time interval corresponding to the second time interval. The processing module 802 is further configured to cancel or determine to retain a sidelink buffer status report or a scheduling request according to a second preset rule, where the second preset rule is determined based on the third time interval and the fourth time interval.

Optionally, the processing module 802 is further configured to release or determine to retain the first resource according to a third preset rule, where the third preset rule is determined based on the third time interval and the fourth time interval.

Optionally, the first resource is a resource reserved by the second terminal device. That the obtaining module 801 is configured to obtain a second time interval includes: the obtaining module 801 is configured to determine, based on a QoS parameter of a third service and a correspondence between a time interval and a QoS parameter, the second time interval corresponding to the QoS parameter of the third service, where the third service is a service to be transmitted on the first resource by the second terminal device.

Optionally, the first resource is a resource reserved by the second terminal device. That the obtaining module 801 is configured to obtain a second time interval includes: the obtaining module 801 is configured to receive a scheduling assignment (SA) from the second terminal device, where the SA includes the second time interval. Optionally, that the obtaining module 801 is configured to receive an SA from the second terminal device may include: The obtaining module 801 is configured to receive the SA from the second terminal device by using the transceiver module 803.

Optionally, the first resource is a resource reserved by the second terminal device. That the obtaining module 801 is configured to obtain a fourth time interval includes: the obtaining module 801 is configured to receive the fourth time interval from the network device, or the obtaining module 801 is configured to obtain the fourth time interval preconfigured by the first terminal device. Optionally, that the obtaining module 801 is configured to receive the fourth time interval from the network device may include: The obtaining module 801 is configured to receive the fourth time interval from the network device by using the transceiver module 803.

Optionally, the first resource is a resource reserved for the first service. The obtaining module 801 is further configured to obtain a third time interval and a fourth time interval, where the third time interval is a time interval between a current moment and a start moment of the first resource, and the fourth time interval is a time interval corresponding to the second time interval. The processing module 802 is further configured to cancel or determine to retain a sidelink buffer status report or a scheduling request according to a fourth preset rule, where the fourth preset rule is determined based on the third time interval and the fourth time interval.

The processing module 802 is further configured to release or determine to retain the first resource according to a fifth preset rule, where the fifth preset rule is determined based on the third time interval and the fourth time interval.

Optionally, the first resource is a resource reserved for the first service. That the obtaining module 801 is configured to obtain a second time interval includes: The obtaining module 801 is configured to: determine, based on a QoS parameter of the first service and a correspondence between a time interval and a QoS parameter, the second time interval corresponding to the QoS parameter of the first service.

Optionally, that the obtaining module 801 is configured to obtain a fourth time interval includes: The obtaining module 801 is configured to determine, based on a QoS parameter of the second service and the correspondence between a time interval and a QoS parameter, the fourth time interval corresponding to the QoS parameter of the second service.

Optionally, the second time interval is configured by a network device, or the second time interval is preconfigured by the first terminal device. That the obtaining module 801 is configured to obtain a fourth time interval includes: The obtaining module 801 is configured to determine the second time interval configured by the network device or preconfigured by the first terminal device as the fourth time interval.

Optionally, the transceiver module 803 is configured to send a preemption message.

All related content of the steps in the foregoing method embodiments may be cited in functional descriptions of the corresponding functional modules. Details are not described herein again.

In this embodiment, the first terminal device 80 is presented in a form of function modules obtained through division performed in an integrated manner. The "module" herein may be an application-specific integrated circuit (ASIC), a circuit, a processor and a memory that execute one or more software or firmware programs, an integrated logic circuit, and/or another device that can provide the foregoing functions. In a simple embodiment, persons skilled in the art may figure out that the first terminal device 80 may be the form of the communications apparatus 40 shown in FIG. 2.

For example, the processor 401 of the communications apparatus 40 shown in FIG. 2 may invoke computer-executable instructions stored in the memory 403, so that the communications apparatus 40 performs the resource preemption method in the foregoing method embodiments.

Specifically, functions/implementation processes of the obtaining module 801, the processing module 802, and the transceiver module 803 in FIG. 8 may be implemented by the processor 401 of the communications apparatus 40 shown in FIG. 2 by invoking the computer-executable instructions stored in the memory 403. Alternatively, functions/implementation processes of the obtaining module 801 and the processing module 802 shown in FIG. 8 may be implemented by the processor 401 of the communications apparatus 40 shown in FIG. 2 by invoking the computer-executable instructions stored in the memory 403. Functions/implementation processes of the transceiver module 803 shown in FIG. 8 may be implemented by the communications interface 404 of the communications apparatus 40 shown in FIG. 2.

The first terminal device 80 provided in this embodiment can perform the foregoing resource preemption method. Therefore, for technical effects that can be obtained by the first terminal device 80, refer to the foregoing method embodiments. Details are not described herein again.

Optionally, the embodiments of this application further provide a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and data. The processor may invoke program code stored in the memory, to indicate the communications apparatus to perform the method in any one of the foregoing method embodiments. Certainly, the memory may not be in the communications apparatus. When the communications apparatus is the chip system, the communications apparatus may include a chip, or may include a chip and another discrete component. This is not specifically limited in this embodiment of this application.

All or some of the foregoing embodiments may be implemented by using software, hardware, firmware, or any combination thereof in the foregoing embodiments. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like. In this embodiment of this application, the computer may include the foregoing apparatus.

Although this application is described with reference to the embodiments, in a process of implementing this application that claims protection, persons skilled in the art may understand and implement other variations of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the spirit and scope of this application. Correspondingly, the specification and accompanying drawings are merely example descriptions of this application defined by the appended claims, and are considered as any or all of modifications, variations, combinations, or equivalents that cover the scope of this application. It is clear that persons skilled in the art can make various modifications and variations to this application without departing from the spirit and scope of this application. This application is intended to cover these modifications and variations of this application provided that the modifications and variations fall within the scope of protection defined by the following claims and their equivalent technologies of this application.

What is claimed is:

1. A resource preemption method, wherein the method comprises:
   obtaining, by a first terminal device, a first time interval and a second time interval, wherein the first time interval is a time interval related to a first resource, the second time interval indicates a preemption forbidden time, and wherein at least one of the following is true:
   the first resource is a resource reserved by a second terminal device, or
   the first resource is a resource reserved for a first service to be transmitted by the first terminal device; and
   preempting or determining not to preempt, by the first terminal device, the first resource according to a first preset rule, wherein the first preset rule is determined based on the first time interval and the second time interval.

2. The method according to claim 1, wherein the first preset rule comprises:
   when the first time interval is greater than the second time interval, the first terminal device preempts the first resource; or
   when the first time interval is less than or equal to the second time interval, the first terminal device determines not to preempt the first resource.

3. The method according to claim 1, wherein the first resource is a resource reserved by the second terminal device, and the method further comprises:
   obtaining, by the first terminal device, a third time interval and a fourth time interval, wherein the third time interval is a time interval between a current moment and a start moment of the first resource, and the fourth time interval is a time interval corresponding to the second time interval; and
   canceling or determining to retain, by the first terminal device, a sidelink buffer status report or a scheduling request according to a second preset rule, wherein the second preset rule is determined based on the third time interval and the fourth time interval.

4. The method according to claim 3, wherein the second preset rule comprises:
   when the third time interval is less than the fourth time interval, the first terminal device cancels the sidelink buffer status report or the scheduling request.

5. The method according to claim 3, wherein the method further comprises:
   releasing or determining to retain, by the first terminal device, the first resource according to a third preset rule, wherein the third preset rule is determined based on the third time interval and the fourth time interval.

6. The method according to claim 5, wherein the third preset rule comprises:
   when the third time interval is greater than or equal to the fourth time interval, and the first terminal device obtains information about a resource scheduled by a network device for the first terminal device, the first terminal device releases the first resource.

7. The method according to claim 3, wherein the obtaining, by a first terminal device, the second time interval comprises:
   determining, by the first terminal device based on a quality of service (QoS) parameter of a third service and a correspondence between a time interval and a QoS parameter, the second time interval corresponding to the QoS parameter of the third service, wherein the third service is a service to be transmitted on the first resource by the second terminal device.

8. The method according to claim 3, wherein the obtaining, by a first terminal device, the second time interval comprises:
   receiving, by the first terminal device, a scheduling assignment (SA) from the second terminal device, wherein the SA comprises the second time interval.

9. The method according to claim 8, wherein the obtaining, by the first terminal device, a fourth time interval comprises:
   receiving, by the first terminal device, the fourth time interval from a network device; or
   obtaining, by the first terminal device, the fourth time interval preconfigured by the first terminal device.

10. The method according to claim 1, wherein the first resource is a resource reserved for the first service, and the method further comprises:
    obtaining, by the first terminal device, a third time interval and a fourth time interval, wherein the third time interval is a time interval between a current moment and a start moment of the first resource, and the fourth time interval is a time interval corresponding to the second time interval; and
    canceling or determining to retain, by the first terminal device, a sidelink buffer status report or a scheduling request according to a fourth preset rule, wherein the fourth preset rule is determined based on the third time interval and the fourth time interval.

11. The method according to claim 10, wherein the fourth preset rule comprises:
    when the third time interval is less than the fourth time interval, the first terminal device determines to retain the sidelink buffer status report or the scheduling request.

12. The method according to claim 10, wherein the method further comprises:
    releasing or determining to retain, by the first terminal device, the first resource according to a fifth preset rule, wherein the fifth preset rule is determined based on the third time interval and the fourth time interval.

13. The method according to claim 12, wherein the fifth preset rule comprises:
    when the third time interval is greater than or equal to the fourth time interval, and the first terminal device obtains information about a resource scheduled by a network device for the first terminal device, the first terminal device releases the first resource, or the first terminal device determines to send data of the first service on the first resource.

14. The method according to claim 10, wherein the obtaining, by a first terminal device, the second time interval comprises:
    determining, by the first terminal device based on a QoS parameter of the first service and a correspondence between a time interval and a QoS parameter, the second time interval corresponding to the QoS parameter of the first service.

15. The method according to claim 7, wherein the obtaining, by the first terminal device, a fourth time interval comprises:
determining, by the first terminal device based on a QoS parameter of a second service and the correspondence between a time interval and a QoS parameter, the fourth time interval corresponding to the QoS parameter of the second service, wherein the second service is to be transmitted by the first terminal device, and a priority of the first service is lower than of a priority of the second service.

16. The method according to claim 3, wherein the second time interval is configured by a network device, or the second time interval is preconfigured by the first terminal device; and the obtaining, by the first terminal device, a fourth time interval comprises:
determining, by the first terminal device, the second time interval as the fourth time interval.

17. The method according to claim 1, wherein the method further comprises:
sending, by the first terminal device, a preemption message, wherein
the preemption message comprises an area identifier of the first terminal device;
the preemption message is scrambled by using the area identifier of the first terminal device; or
the preemption message comprises a speed threshold and a speed at which the first terminal device sends the preemption message.

18. A first terminal device, wherein the first terminal device comprises:
at least one processor; and
one or more memories coupled to the at least one processor and storing programming instructions for execution by the at least one processor to cause the first terminal device to:
obtain a first time interval and a second time interval, wherein the first time interval is a time interval related to a first resource, the second time interval indicates a preemption forbidden time, and wherein at least one of the following is true:
the first resource is a resource reserved by a second terminal device, or
the first resource is a resource reserved for a first service to be transmitted by the first terminal device; and
preempt or determine not to preempt the first resource according to a first preset rule, wherein the first preset rule is determined based on the first time interval and the second time interval.

19. The first terminal device according to claim 18, wherein the first preset rule comprises:
when the first time interval is greater than the second time interval, the first terminal device preempts the first resource; or
when the first time interval is less than or equal to the second time interval, the first terminal device determines not to preempt the first resource.

20. A non-transitory computer-readable medium storing computer instructions, that when executed by one or more hardware processors, cause a first terminal device to perform operations comprising:
obtaining a first time interval and a second time interval, wherein the first time interval is a time interval related to a first resource, the second time interval indicates a preemption forbidden time, and wherein at least one of the following is true:
the first resource is a resource reserved by a second terminal device, or
the first resource is a resource reserved for a first service to be transmitted by the first terminal device; and
preempting or determining not to preempt the first resource according to a first preset rule, wherein the first preset rule is determined based on the first time interval and the second time interval.

* * * * *